(12) United States Patent
Faulhaber et al.

(10) Patent No.: US 8,069,285 B2
(45) Date of Patent: Nov. 29, 2011

(54) METHODS AND SYSTEMS FOR IMPROVING COMMUNICATION THROUGHPUT OF STORAGE LINKS

(75) Inventors: Steven F. Faulhaber, Bloomington, MN (US); Luke E. McKay, Rose Hill, KS (US); Brian K. Einsweiler, Colorado Springs, CO (US); Warren R. Volz, Denver, CO (US); Jason C. McGinley, Castle Rock, CO (US)

(73) Assignee: LSI Corporation, Milpitas, CA (US)

( * ) Notice: Subject to any disclaimer, the term of this patent is extended or adjusted under 35 U.S.C. 154(b) by 373 days.

(21) Appl. No.: 12/347,783

(22) Filed: Dec. 31, 2008

(65) Prior Publication Data

US 2010/0169899 A1 Jul. 1, 2010

(51) Int. Cl.
*G06F 13/00* (2006.01)
*G06F 3/00* (2006.01)
(52) U.S. Cl. ............... 710/58; 710/2; 710/8; 710/33
(58) Field of Classification Search .................. None
See application file for complete search history.

(56) References Cited

U.S. PATENT DOCUMENTS

2004/0199834 A1* 10/2004 Fukae ..................... 714/699
2006/0041614 A1* 2/2006 Oe ........................... 709/203

OTHER PUBLICATIONS

Lanzani, Christian, OBSAI RP3-01 6.144 Gbps Interface Implementation, 2007, FPGAworld.com, [online, accessed on Jul. 27, 2011], URL: http://www.obsai.org.*

* cited by examiner

*Primary Examiner* — Tariq Hafiz
*Assistant Examiner* — Scott Sun
(74) *Attorney, Agent, or Firm* — Duft Bornsen & Fishman LLP

(57) ABSTRACT

Methods and systems for improving communication throughput of a link between SAS/SATA devices. The link, initially established at a first signal rate, is one of a SATA link and a SAS link. A SAS/SATA device increments one of the at least one counter based on an error sensed on the link. Based on the at least one counter, the SAS/SATA device determines whether to maintain the first signal rate. The link is re-established at a second signal rate based on the determination such that the second signal rate is lower than the first signal rate.

20 Claims, 4 Drawing Sheets

METHODS AND SYSTEMS FOR IMPROVING COMMUNICATION THROUGHPUT OF STORAGE LINKS

BACKGROUND

1. Field of the Invention

The invention relates generally to communication between devices in a storage application and more specifically relates to improving communication throughput of Serial Advanced Technology Attachment ("SATA") or Serial Attached SCSI ("SAS") links.

2. Discussion of Related Art

As applications of information technology have become pervasive in our world, the demand for ever faster data transfer speeds has also skyrocketed. For example, the AT Attachment ("ATA") standard was initially introduced at 16 MB/s. Recently, the industry has adopted the Serial ATA ("SATA") standard with an initial signal rate of 1.5 Gbps. A 12 Gbps signal rate is already being planned for Serial Attached SCSI ("SAS").

However, it has become difficult to beneficially achieve even a signal rate of 3 Gbps. Despite the dramatic increase in signal rates, the materials used for conducting data transfers have remained very much the same. For example, FR4, which is a commonly used printed circuit board ("PCB") material, is very lossy at 3 Gbps. Even very slight impedance mismatches on a PCB would result in large variations in received signal quality at 3 Gbps.

Large variations in received signal quality at a higher signal rate can in fact result in lowered communication throughput compared to having high signal quality at a lower signal rate. This is because retransmission of data packets, resynchronization/retraining of signals, and/or resetting the communication link can all lower the overall communication throughput. However, although signal quality can be higher at a lower signal rate, there is not a way to effectively achieve higher communication throughput. For example, manual trial and error for achieving higher communication throughput by varying signal rates is not only tedious but is usually impractical in large scale and field applications.

Thus it is an ongoing challenge to improve communication throughput of SATA and SAS links.

SUMMARY

The present invention solves the above and other problems, thereby advancing the state of the useful arts, by providing methods and systems for improving communication throughput of a link between SAS/SATA devices. The link, initially established at a first signal rate, is one of a SATA link and a SAS link. A SAS/SATA device increments a counter based on an error sensed on the link. Based on a value of the counter, the SAS/SATA device determines whether to maintain the first signal rate. Based on the determination, the link is re-established at a second signal rate such that the second signal rate is lower than the first signal rate. Beneficially, the link can be established at a signal rate that achieves higher communication throughput by varying signal rates adaptively and automatically.

In one aspect hereof, a method is provided for improving communication throughput of a link between SAS/SATA devices. At least one counter is associated with the link. The method comprises establishing the link at a first signal rate and incrementing one of the at least one counter based on an error sensed on the link. The method also comprises determining, based on the at least one counter, whether to maintain the first signal rate. The method further comprises re-establishing the link at a second signal rate based on the determination. The second signal rate is lower than the first signal rate. Additionally, the link is one of a Serial ATA ("SATA") link and a Serial Attached SCSI ("SAS") link.

Another aspect hereof provides a SAS/SATA device for improving communication throughput of a link with another SAS/SATA device. At least one counter is associated with the link. The SAS/SATA device comprises the at least one counter and an establishing element for establishing the link at a first signal rate. The SAS/SATA device also comprises an incrementing element for incrementing one of the at least one counter based on an error sensed on the link. The SAS/SATA device further comprises a determining element for determining, based on the at least one counter, whether to maintain the first signal rate. Additionally, the SAS/SATA device comprises a re-establishing element for re-establishing the link at a second signal rate based on the determination. The second signal rate is lower than the first signal rate. Additionally, the link is one of a Serial ATA ("SATA") link and a Serial Attached SCSI ("SAS") link.

Yet another aspect hereof provides a system for improving communication throughput of a link between SAS/SATA devices. At least one counter is associated with the link. The system comprises a first SAS/SATA device, which comprises the at least one counter and an incrementing element for incrementing one of the at least one counter based on an error sensed on the link. The first SAS/SATA device also comprises a determining element for determining, based on the at least one counter, whether to maintain a first signal rate. Additionally, the first SAS/SATA device comprises a sending element for sending a message from the first SAS/SATA device to a second SAS/SATA device based on the determination. The system also comprises the second SAS/SATA device and a third SAS/SATA device. The second SAS/SATA device comprises an establishing element for establishing the link to the third SAS/SATA device at the first signal rate. The second SAS/SATA device also comprises a receiving element for receiving the message and a re-establishing element for re-establishing the link at a second signal rate to the third SAS/SATA device based on the message. The second signal rate is lower than the first signal rate. Additionally, the link is one of a Serial ATA ("SATA") link and a Serial Attached SCSI ("SAS") link.

DETAILED DESCRIPTION OF THE DRAWINGS

Figure 1:
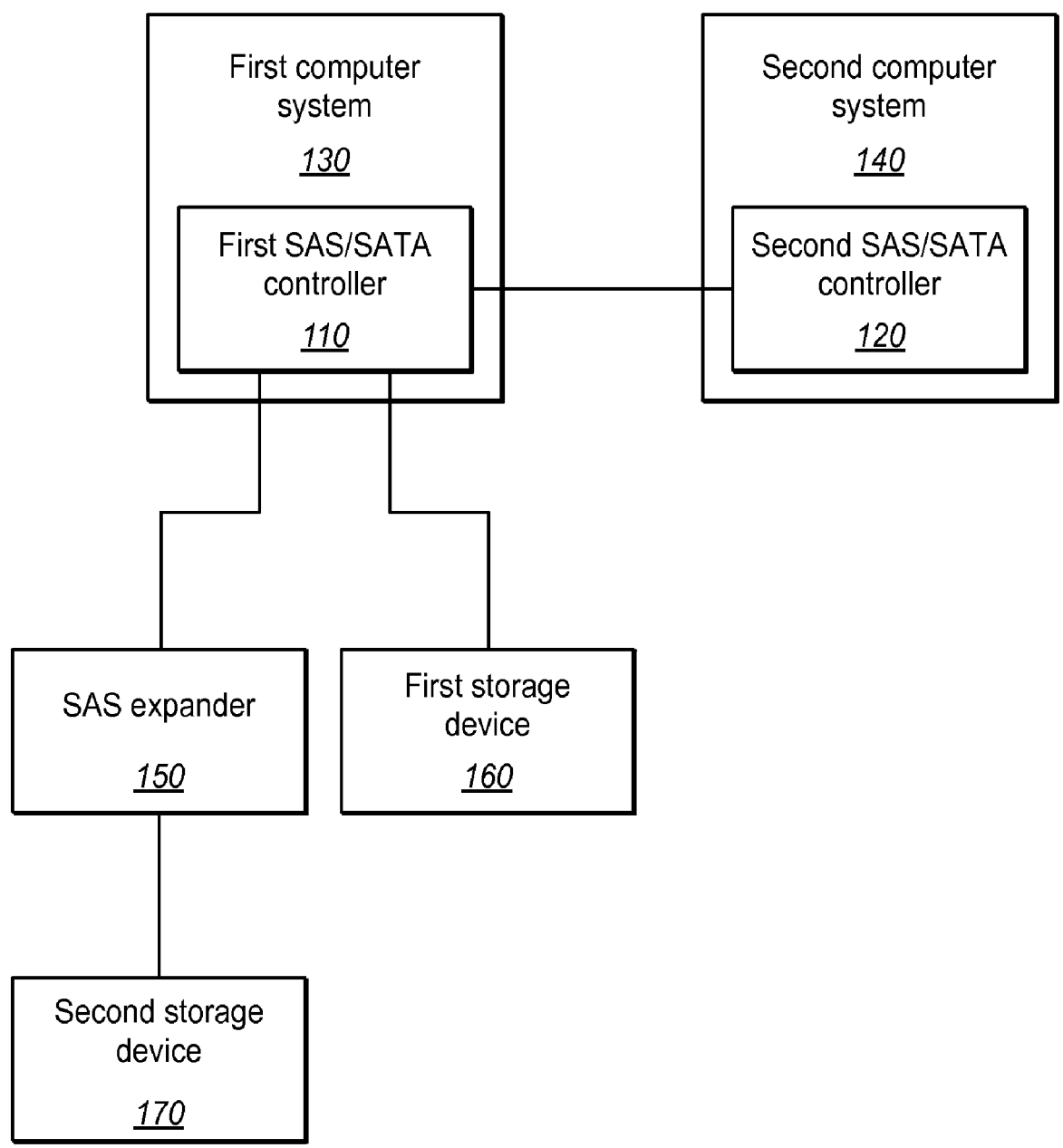
FIG. 1 is a block diagram of an exemplary system for improving communication throughput of a link between SAS/SATA devices in accordance with features and aspects hereof.

FIG. 1 is a block diagram of an exemplary system for improving communication throughput of a link between SAS/SATA devices in accordance with features and aspects hereof. A first computer system 130 comprises a first SAS/SATA controller 110. The computer system 130 may be a computer server, a computer client, or any computing system that comprises a SAS/SATA controller. The first SAS/SATA controller 110 may be any host bus adapter including a Redundant Array of Independent Disks ("RAID") controller that supports the SAS and/or SATA interface.

FIG. 1 exemplifies a variety of SAS/SATA links that may advantageously apply the features and benefits hereof. Such links may include SAS/SATA links coupling a computer system to another computer system, coupling a computer system directly with a SAS/SATA device, or coupling a computer system to SAS/SATA devices through a SAS domain comprising one or more SAS expanders.

The first computer system 130 is in communication, through the first SAS/SATA controller 110, with a second computer system 140, a first storage device 160, and a SAS expander 150. The second computer system 140 is similar to the first computer system 130, and the second computer system 140 includes a second SAS/SATA controller 120 that is similar to the first SAS/SATA controller 110. The two computer systems are in communication through the two SAS/SATA controllers. The first computer system 130 is also in communication with a second storage device 170 through the first SAS/SATA controller 110 and the SAS expander 150. The SAS expander 150 comprises a component used for facilitating communications between SAS/SATA devices. For example, the SAS expander 150 may help an initiator (e.g., the first SAS/SATA controller 110) to communicate with a SAS/SATA target (e.g., the second storage device 170). The first storage device 160 and the second storage device 170 may be any drives that support the SAS and/or SATA interface. For example, a drive may be a disk drive, a tape storage device, a robotic tape library, a solid state drive, etc.

Figure 2:
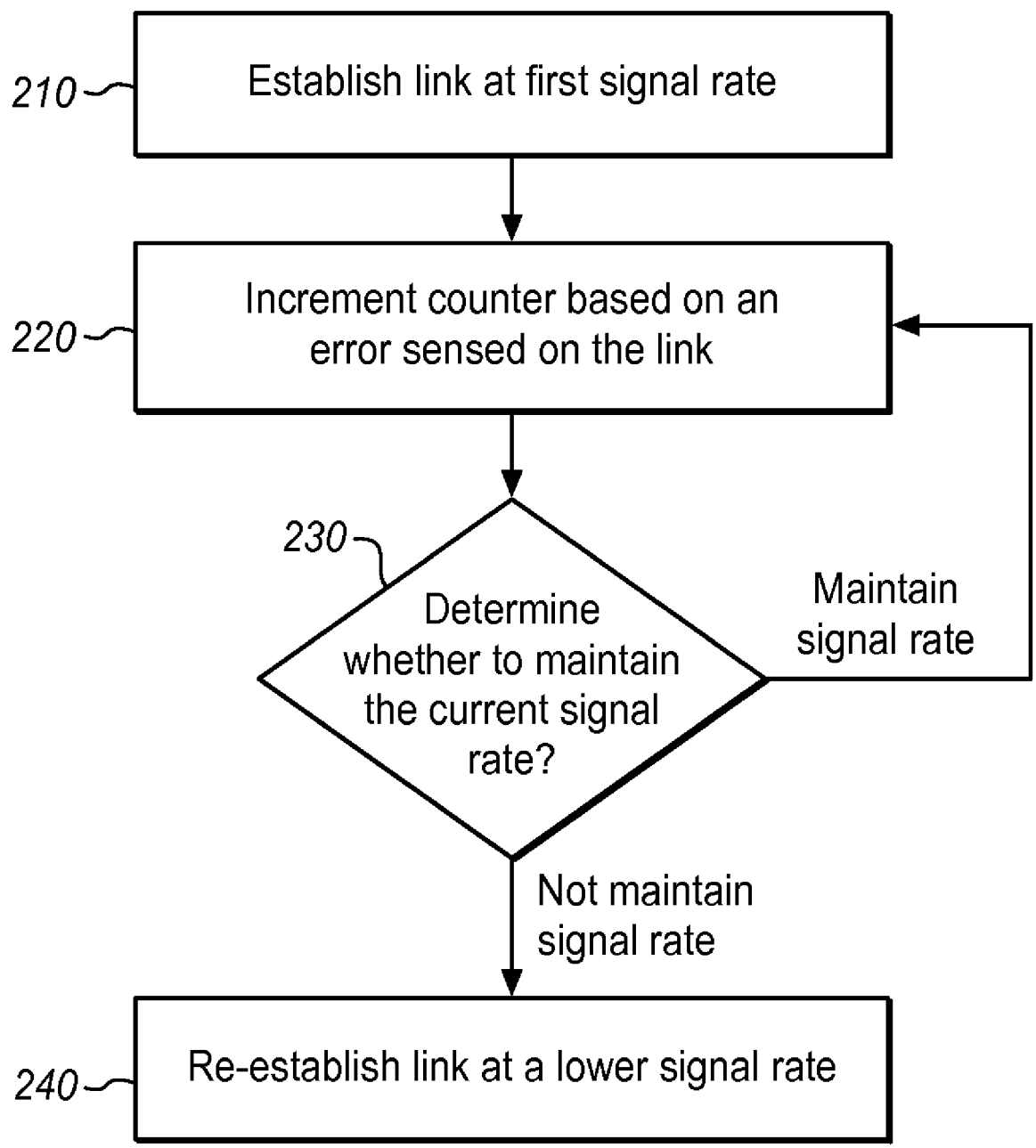
FIG. 2 is a flowchart describing an exemplary method in accordance with features and aspects hereof to improve communication throughput of a link between SAS/SATA devices.

FIG. 2 is a flowchart describing an exemplary method in accordance with features and aspects hereof to improve communication throughput of a link between SAS/SATA devices. At step 210, the link that is associated with at least one counter is established at a first signal rate. At step 220, a SAS/SATA device increments one of the at least one counter based on an error sensed on the link. At step 230, the SAS/SATA device determines, based on the at least one counter, whether to maintain the first/current signal rate. If the current signal rate is to be maintained, the SAS/SATA device returns to step 220 and may increment one of the at least one counter based on another error sensed on the link. If the current signal rate is not to be maintained, the link is re-established at a second signal rate at step 240 such that the second signal rate is lower than the first signal rate.

It is noted that the link is one of a SATA link and a SAS link. Signal rates of SATA and SAS links have increased from 1.5 Gbps to 3 Gbps, and then to 6 Gbps. Additionally, 12 Gbps is already being planned for the SAS standard. As noted above, a higher signal rate does not necessarily imply a higher communication throughput. However, the standards do not provide a way to automatically adjust the signal rate and cannot automatically achieve a higher communication throughput. Beneficially, the exemplary method allows the link to be re-established at a signal rate that achieves higher communication throughput by varying signal rates adaptively and automatically based on the errors sensed on the link.

Figure 3:
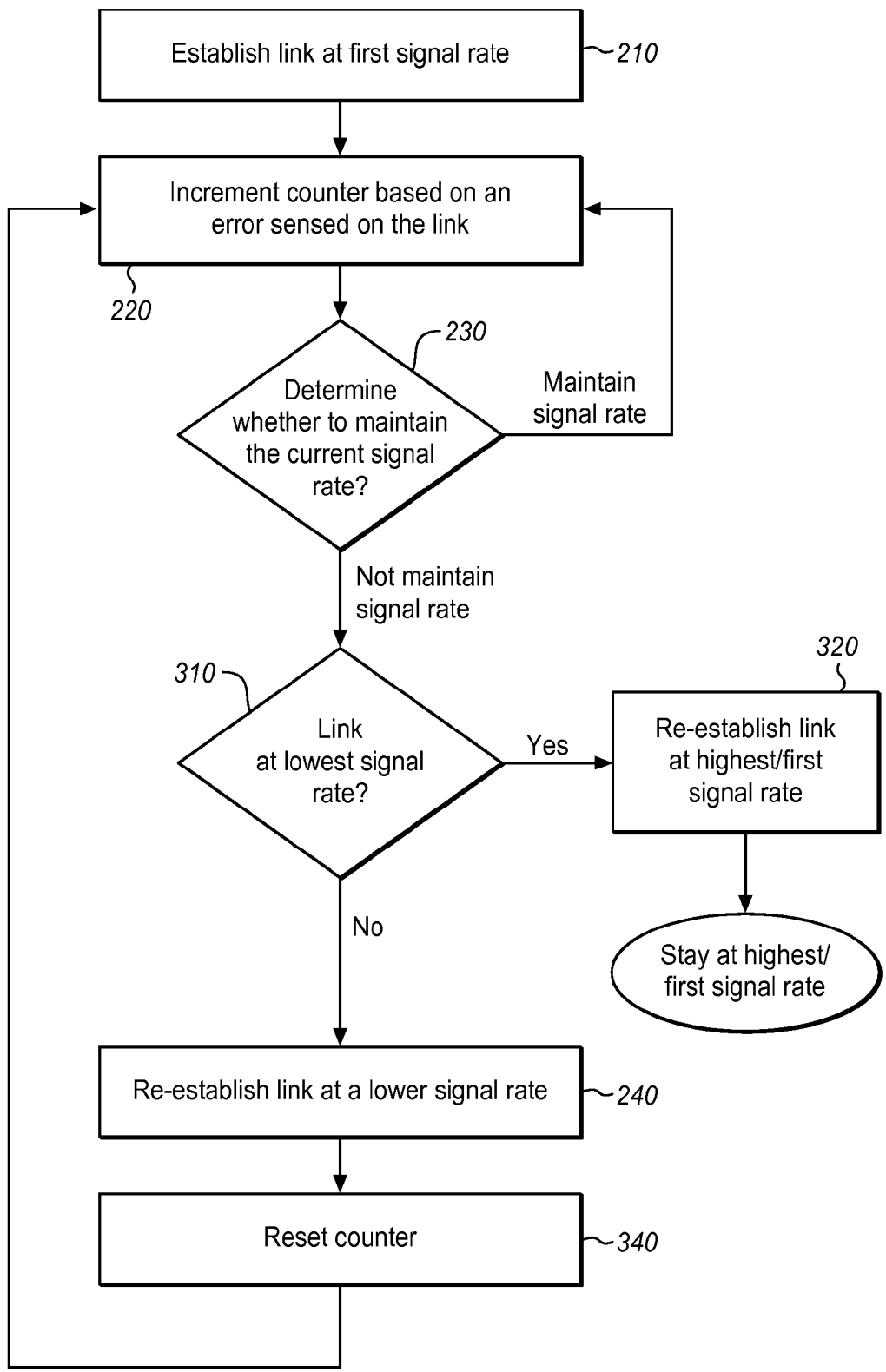
FIG. 3 is a flowchart describing exemplary additional details to improve communication throughput of a link between SAS/SATA devices.

FIG. 3 is a flowchart describing exemplary additional details to improve communication throughput of a link between SAS/SATA devices. At step 210, a first SAS/SATA device establishes the link that is associated with at least one counter at a first signal rate. For example, a first computer system may establish a link through a first SAS/SATA controller with a second SAS/SATA controller of a second computer system, directly with a first storage device, or with a second storage device through an intermediate SAS expander. In establishing the link between the first SAS/SATA controller and the second storage device through the intermediate SAS expander (i.e., through a SAS domain fabric), a link is established between the first SAS/SATA controller and the intermediate SAS expander and another link is established between the intermediate SAS expander and the second storage device. Indeed, each of the SAS/SATA devices may be one of a SATA controller, a SAS controller, a SATA drive, a SAS drive, and a SAS expander.

At step 220, one of the at least one counter is incremented based on an error sensed on the link. For example, the SAS standard specifies types of error including invalid dword, running disparity error, and PHY reset problem. Each of these error types is associated with a counter such that the counter is incremented when the corresponding error is detected. Other counters may include a counter for a number of times that the PHY has restarted the link reset sequence due to loss of dword synchronization. These counters may be tracked at any one or more of the SAS/SATA devices including the first SAS/SATA controller.

At step 230, the first SAS/SATA device determines whether to maintain the current signal rate. In some instances, the first SAS/SATA device may read counters of another SAS/SATA device in order to make this determination. Triggers for making this determination include when the link is reset. For example, the SAS standard specifies that if the PHY loses dword synchronization, the PHY shall restart the link reset sequence. Similarly, if the PHY receives a MUX primitive that does not match the MUX primitive expected in that position, the PHY shall also restart the link reset sequence. For brevity, not all the reasons that result in the link being reset are described. In some instances, this determination may be made when an error is sensed on the link and/or a counter is incremented.

The first SAS/SATA device may make this determination (of whether to maintain the current signal rate) by checking whether one of the at least one counter exceeds a pre-defined value. It is noted that each of the at least one counter may be associated with a corresponding pre-defined value. Each of the at least one corresponding pre-defined value may be specified by the manufacturer and/or administered by a user of a computer system that comprises the first SAS/SATA device. If any of the at least one counter exceeds its corresponding pre-defined value, the first SAS/SATA device may make a determination that the current signal rate is not to be maintained. Otherwise, the first SAS/SATA device may make a determination that the current signal is to be maintained.

Alternatively and/or in addition, the first SAS/SATA device may make this determination by checking whether a change within one of the at least one counter over a time period exceeds a pre-defined value. In effect, the method allows frequency of error to be considered. Each of the at least one counter may be associated with a corresponding pre-defined value for considering frequency of error. Each of the at least one corresponding pre-defined value may also be specified by the manufacturer and/or administered by a user of a computer system that comprises the first SAS/SATA device. The first SAS/SATA device checks time stamps and/or durations (e.g., comparing snapshots of the at least one counter at different intervals) in order to determine whether changes within any of the at least one counter exceeds its corresponding pre-defined value. If not, the first SAS/SATA device may make a determination that the current signal rate is to be maintained. If so, the first SAS/SATA device may make a determination that the current signal rate is not to be maintained.

Additionally, while the pre-defined values may be the same at each signal rate, they may also be pre-defined differently. For example, a first pre-defined value at a higher signal rate may be greater than or equal to a second pre-defined value at a lower signal rate. As a more specific example, while a pre-defined value may be 8 at 3 Gbps, the pre-defined value may be lowered to 4 at 1.5 Gbps because the lower signal rate should tolerate fewer errors. However, it may also be decided that no more than 4 errors should be tolerated at any signal rate, and the pre-defined value would be defined to be the same at all signal rates.

If the current signal rate is to be maintained, the first SAS/SATA device returns to step 220 so that one of the at least one counter is incremented based on another error sensed on the link. If the current signal rate is not to be maintained, the first SAS/SATA device proceeds to step 310 to determine whether the link is at a lowest signal rate. If the link is not already at the lowest signal rate, the first SAS/SATA device re-establishes at step 240 the link at a lower signal rate. For example, if the current signal rate is 24 Gbps, a lower signal rate including one of 12 Gbps and 6 Gbps may be used. If the current signal rate is 12 Gbps, a lower signal rate including one of 6 Gbps, 3 Gbps, and 1.5 Gbps may be used. The lower signal rate may be selected from a table or based on a lowering factor. For example, a lowering factor may include 50%, 25%, and 12.5%. If the current signal rate is 6 Gbps, a lower signal rate including 3 Gbps and 1.5 Gbps may be used (e.g., the first signal rate may be 6 Gbps, a second signal rate may be re-established at 3 Gbps, and a third signal rate may in turn be re-established at 1.5 Gbps). If the current signal rate is 3 Gbps, a lower signal rate including 1.5 Gbps may be used.

At step 340, at least the one of the at least one counter is reset as the link is re-established. The first SAS/SATA device returns to step 220 so that one of the at least one counter is incremented based on another error sensed on the link. If at step 310 the first SAS/SATA device determines that the link is already at a lowest signal rate, the first SAS/SATA device proceeds to step 320 to re-establish the link at a highest (which may be the first) signal rate. The link then stays at this highest/first signal rate. This is because lowering the signal rate does not appear to have improved communication throughput as errors continue to be sensed on the link. It may be more beneficial to simply return to the highest signal rate.

It will be understood that it may not be necessary to completely re-implement how an existing SAS/SATA device establishes a link. Rather, steps 210 and 240 may comprise setting an internal state with a desired signal rate such that when the SAS/SATA device establishes a link as part of an existing operation, the link is established based on the internal state with the desired signal rate. Additionally, it will be understood that the first SAS/SATA device may send a message to a second SAS/SATA device for the second SAS/SATA device to establish a link with a third SAS/SATA device based on the message. For example, the first SAS/SATA controller may send a message to the SAS expander, the SAS expander receives the message and, in turn, establishes a link with the second storage device based on the message. The determinations at steps 230 and 310 may be made at the first SAS/SATA device, although the determinations may also be based on at least one counter that is associate with the second SAS/SATA device (and the first SAS/SATA device would read the at least one counter from the second SAS/SATA device).

Those of ordinary skill in the art will readily recognize numerous additional and equivalent steps that may be performed and/or omitted in the methods of FIGS. 2 and 3. Such additional and equivalent steps are omitted herein merely for brevity and simplicity of this discussion.

Figure 4:
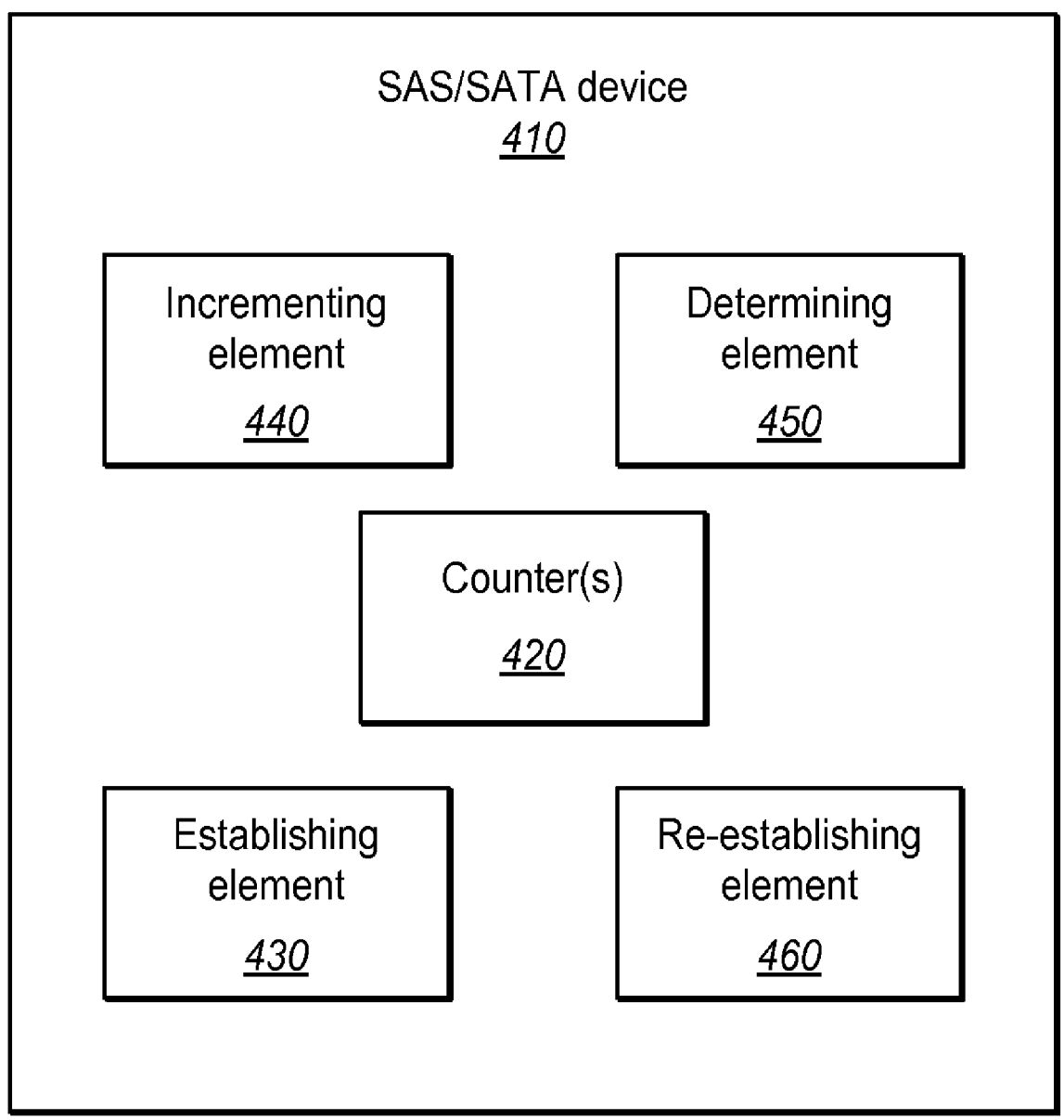
FIG. 4 is a block diagram of an exemplary SAS/SATA device for improving communication throughput of a link between SAS/SATA devices in accordance with features and aspects hereof.

FIG. 4 is a block diagram of an exemplary SAS/SATA device for improving communication throughput of a link between SAS/SATA devices in accordance with features and aspects hereof. Those of ordinary skill in the art will readily recognize that features and aspects hereof may be implemented equivalently in electronic circuits or as suitably programmed instructions of a general or special purpose processor. The SAS/SATA device 410 comprises at least one counter 420 that is associated with the link. The SAS/SATA device 410 also comprises an establishing element 430 for establishing the link at a first signal rate. Additionally, the SAS/SATA device 410 comprises an incrementing element 440 for incrementing one of the at least one counter based on an error sensed on the link. The SAS/SATA device 410 further comprises a determining element 450 for determining, based on the at least one counter, whether to maintain the first signal rate. The SAS/SATA device 410 also comprises a re-establishing element 460 (that may be substantially the same as the establishing element 430) for re-establishing the link at a second signal rate based on the determination.

Those of ordinary skill in the art will readily recognize numerous additional and equivalent components and modules within a fully functional system and storage controller. Such additional and equivalent components are omitted herein for simplicity and brevity of this discussion. Thus, the structures of FIGS. 1 and 4 are intended merely as representatives of exemplary embodiments of features and aspects hereof.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for improving communication throughput of a link between Serial Attached SCSI (SAS) / Serial ATA (SATA) devices, wherein at least one counter is associated with the link, the method comprising:
   establishing the link at a first signal rate;
   incrementing one of the at least one counter based on an error sensed on the link;
   determining, based on the at least one counter, whether to maintain the first signal rate;
   re-establishing the link at a second signal rate based on the determination;
   wherein the second signal rate is lower than the first signal rate; and
   wherein the link is one of a SATA link and a SAS link;
   resetting at least one of the at least one counter;
   incrementing one of the at least one counter based on another error sensed on the link;
   determining that the lower signal rate encounters a similar amount of errors as the first signal rate, based on the least one counter; and
   re-establishing the link at the first signal rate based on the determination.

2. The method of claim 1, wherein each of the SAS/SATA devices is one of a SATA controller, a SAS controller, a SATA drive, a SAS drive, and a SAS expander.

3. The method of claim 1, wherein a type of the error is one of invalid dword, running disparity error, and PHY reset problem.

4. The method of claim 1, wherein the first signal rate is selected from 12 Gbps, 6 Gbps, and 3 Gbps, and wherein the second signal rate is selected from 6 Gbps, 3 Gbps, and 1.5 Gbps.

5. The method of claim 1, wherein the determining step comprises checking whether one of the at least one counter exceeds a pre-defined value.

6. The method of claim 1, wherein the determining step comprises checking whether a change within one of the at least one counter over a time period exceeds a pre-defined value.

7. The method of claim 1, wherein the error is a first error, the method further comprising:
    incrementing one of the at least one counter based on a second error sensed on the link;
    determining, based on the at least one counter, whether to maintain the second signal rate; and
    re-establishing the link at a third signal rate based on the determination;
    wherein the third signal rate is lower than the second signal rate.

8. The method of claim 7, wherein:
    determining whether to maintain the first signal rate comprises checking whether one of the at least one counter exceeds a first pre-defined value;
    determining whether to maintain the second signal rate comprises checking whether the one of the at least one counter exceeds a second pre-defined value; and
    the first pre-defined value is greater than or equal to the second pre-defined value.

9. The method of claim 1, wherein the lower signal rate comprises a lowest signal rate for the link.

10. The method of claim 1, further comprising sending a message from a first SAS/SATA device to a second SAS/SATA device, wherein the determining step is performed at the first SAS/SATA device, and wherein the re-establishing step comprises re-establishing the link from the second SAS/SATA device to a third SAS/SATA device based on the message.

11. A Serial Attached SCSI (SAS) / Serial ATA (SATA) device for improving communication throughput of a link with another SAS/SATA device, wherein at least one counter is associated with the link, the SAS/SATA device comprising:
    the at least one counter;
    an establishing element for establishing the link at a first signal rate;
    an incrementing element for incrementing one of the at least one counter based on an error sensed on the link;
    a determining element for determining, based on the at least one counter, whether to maintain the first signal rate;
    a resetting element for resetting the one of the at least one counter and
    a re-establishing element for re-establishing the link at a second signal rate based on the determination;
    wherein the second signal rate is lower than the first signal rate;
    wherein the link is one of a SATA link and a SAS link;
    wherein the incrementing element is further adapted for incrementing at least one of the at least one counter based on another error sensed on the link;
    wherein the determining element is further adapted for determining that the lower signal rate encounters a similar amount of errors as the first signal rate, based on the least one counter; and
    wherein the re-establishing element is further adapted for re-establishing the link at the first signal rate based on the determination.

12. The SAS/SATA device of claim 11, wherein each of the SAS/SATA devices is one of a SATA controller, a SAS controller, a SATA drive, a SAS drive, and a SAS expander.

13. The SAS/SATA device of claim 11, wherein a type of the error is one of invalid dword, running disparity error, and PHY reset problem.

14. The SAS/SATA device of claim 11, wherein the first signal rate is selected from 12 Gbps, 6 Gbps, and 3 Gbps, and wherein the second signal rate is selected from 6 Gbps, 3 Gbps, and 1.5 Gbps.

15. The SAS/SATA device of claim 11, wherein the determining element is further adapted for checking whether one of the at least one counter exceeds a pre-defined value.

16. The SAS/SATA device of claim 11, wherein the determining element is further adapted for checking whether a change within one of the at least one counter over a time period exceeds a pre-defined value.

17. The SAS/SATA device of claim 11, wherein the error is a first error, wherein:
    the incrementing element is further adapted for incrementing one of the at least one counter based on a second error sensed on the link;
    the determining element is further adapted for determining, based on the at least one counter, whether to maintain the second signal rate; and
    the re-establishing element is further adapted for re-establishing the link at a third signal rate based on the determination;
    wherein the third signal rate is lower than the second signal rate.

18. The SAS/SATA device of claim 17, wherein:
    determining whether to maintain the first signal rate comprises checking whether one of the at least one counter exceeds a first pre-defined value;
    determining whether to maintain the second signal rate comprises checking whether the one of the at least one counter exceeds a second pre-defined value; and
    the first pre-defined value is greater than or equal to the second pre-defined value.

19. The SAS/SATA device of claim 11, wherein the lower signal rate comprises a lowest signal rate for the link.

20. A system for improving communication throughput of a link between Serial Attached SCSI (SAS) / Serial ATA (SATA) devices, wherein at least one counter is associated with the link, the system comprising:
    a first SAS/SATA device comprising:
        the at least one counter;
        an incrementing element for incrementing one of the at least one counter based on an error sensed on the link;
        a determining element for determining, based on the at least one counter, whether to maintain a first signal rate;
        a resetting element for resetting the one of the at least one counter; and
        a sending element for sending a message from the first SAS/SATA device to a second SAS/SATA device based on the determination;
    the second SAS/SATA device; and
    a third SAS/SATA device;

wherein the second SAS/SATA device comprises:
   an establishing element for establishing the link to the third SAS/SATA device at the first signal rate;
   a receiving element for receiving the message; and
   a re-establishing element for re-establishing the link at a second signal rate to the third SAS/SATA device based on the message;
wherein the second signal rate is lower than the first signal rate;
wherein the link is one of a SATA link and a SAS link;
wherein the incrementing element is further adapted for incrementing at least one of the at least one counter based on another error sensed on the link;
wherein the determining element is further adapted for determining that the lower signal rate encounters a similar amount of errors as the first signal rate, based on the least one counter; and
wherein the re-establishing element is further adapted for re-establishing the link at the first signal rate based on the determination.

* * * * *